Figure 1:
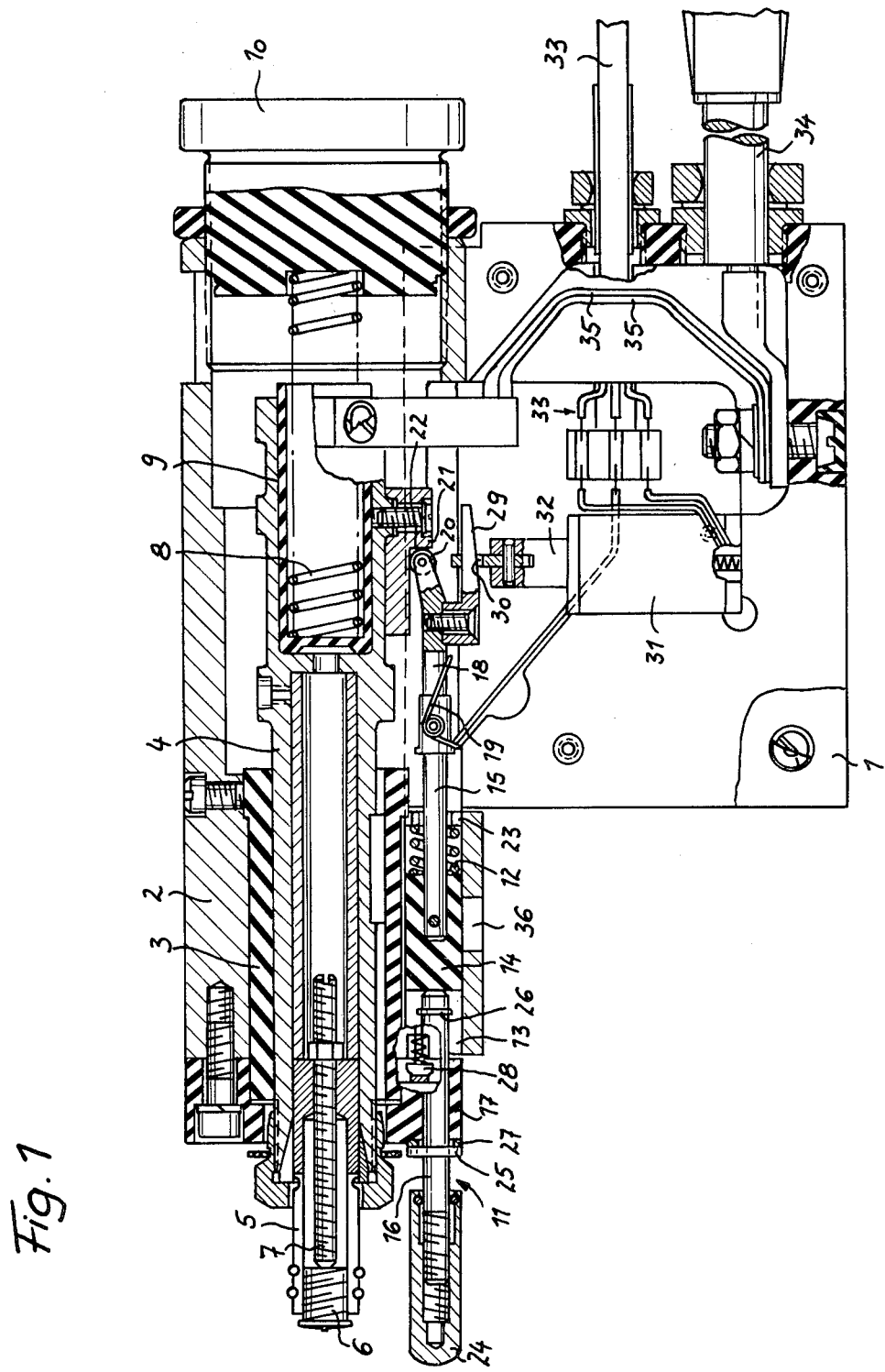

United States Patent [19]

Jordan

[11] 4,441,007
[45] Apr. 3, 1984

[54] ELECTRICAL STUD-WELDING APPARATUS

[75] Inventor: Ernst G. Jordan, Menden, Fed. Rep. of Germany

[73] Assignee: Firma OBO Bettermann OHG, Fed. Rep. of Germany

[21] Appl. No.: 316,974

[22] Filed: Oct. 30, 1981

[30] Foreign Application Priority Data

Feb. 3, 1981 [DE] Fed. Rep. of Germany ....... 3103543

[51] Int. Cl.$^3$ .............................................. B23K 9/20
[52] U.S. Cl. .................................................... 219/98
[58] Field of Search ................. 219/98, 99, 86.21, 95, 219/96, 97, 103

[56] References Cited

U.S. PATENT DOCUMENTS 2,260,969 10/1941 Crecca et al. ......................... 219/98

FOREIGN PATENT DOCUMENTS 573789 3/1976 Sweden ................................ 219/98

Primary Examiner—B. A. Reynolds
Assistant Examiner—Alfred S. Keve
Attorney, Agent, or Firm—Jacobs & Jacobs

[57] ABSTRACT

Electrical stud-welding apparatus of greater efficiency and reliability and more simply operated than known stud-welding apparatus. A base member is provided with a tubular housing, an insulating bushing therewithin and a welding piston inwardly of but of greater length than the bushing. Mounted in the housing is an actuating member under the control of a coil compression spring comprising a rod capped on its forward end on the workpiece side of the apparatus. Means including an electrical control circuit actuate the longitudinally moving parts.

14 Claims, 2 Drawing Figures

ELECTRICAL STUD-WELDING APPARATUS

The present invention relates to an electrical stud-welding apparatus having a welding piston supported for limited axial movement in a housing of the apparatus, on one end of which piston a stud support is provided which protrudes beyond the front end of the apparatus housing and a force accumulator, particularly a coil spring element, presses against its other end, and furthermore having an actuating member by means of which the welding piston can be displaced to its rearward position against the force of the spring element and can be held fast until the welding process is to be started.

In one stud-welding apparatus of the above-described type which is known from West German Pat. No. 2 526 407 on which the present invention is based, one end of an actuating part is pivoted within the apparatus housing to a manually actuable release lever while the other end of the actuating part is held resting against the welding piston in such manner that upon actuation of the release lever the welding piston together with the stud holder and a weld stud inserted therein is brought approximately into operating position against the force of the spring and upon further actuation of the release lever the welding piston is liberated and pressed forward for the welding-on This pistol-trigger-like actuating device, however, after a small number of welding operations carried out in rapid sequence, leads to considerable fatigue of the finger which actuates the trigger. Furthermore, there is the danger that the apparatus will be released—i.e. the welding commenced—before the welding apparatus is in correct position with respect to the workpiece to which a stud is to be welded. Additionally, there is the danger of a change in the position of the previously correctly positioned apparatus upon the release.

Furthermore, those known stud-welding devices which operate on the capacitor-discharge principle have the disadvantage that as a result of wear of the mechanical controls which act on the welding circuit switch, the timing of the discharge of the capacitor continuously changes so as to lead or lag behind the time of impact of the stud onto the workpiece.

According to the present invention a considerably simpler and more convenient and efficient operation is provided than was previously possible, while increasing the reliability of operation. The manner of achieving this goal is characterized by the fact that the actuating member is so shaped in restable fashion on the workpiece side of the apparatus that when the housing of the apparatus is brought toward the workpiece the welding piston is necessarily brought into the ready-for-welding position.

This arrangement has the important advantage that both hands can be used to move back the welding piston and cock the rather strong spring element which acts on the welding piston, so that the apparatus which is supported on the workpiece can be brought into the ready-for-welding position merely by pressing the housing of the apparatus against the workpiece, this resulting in a considerably simpler and better operation than heretofore.

On the other hand, assurance is thereby provided that the apparatus can no longer be actuated prematurely, namely before it has been brought into the required welding position.

One simple embodiment of the actuating member which is favorable from the standpoint of manufacture and particularly favorable in operation consists in configuring it as a rod which is mounted for limited displacement in an axial direction parallel to the welding piston and in its forward position protrudes beyond the stud support when a stud is inserted therein.

For the further simplification of the handling of the apparatus it is furthermore advantageous to provide a coil spring force accumulator which urges the actuating member into its front or forward position to be associated with the actuating member.

In this way the actuating member can be automatically brought back into its starting position. It is therefore not necessary to bring the actuating member manually into the starting position. For this purpose one preferred embodiment is characterized by the fact that as force accumulator for the actuating member there is provided a coil compression spring which is placed on the actuating member with initial tension, resting at one end against a shoulder of the actuating member and at the other end against the housing of the apparatus.

As preferred, robust development for the detachable coupling of the actuating member to the welding piston is characterized by the fact that a pawl which can be acted on by a release device is mounted on the actuating member, the pawl engaging positively into a notch in the welding position in the forward position of the actuating member.

In this connection it is advantageous in order further to increase the useful life of the apparatus for the pawl to bear a rotatably mounted supporting roller on its free end and preferably furthermore for the flank of the notch against which the engaging pawl rests to be flat and arranged at a right angle to the longitudinal axis of the welding piston.

In order further to increase the reliability in operation of the apparatus described above, one advantageous embodiment in accordance with the invention is characterized by the fact that contact elements are arranged on the actuating member, which is electrically insulated from the welding piston and the apparatus housing, and on the housing, the contact elements being so arranged that they indirectly effect a closing of the welding circuit only in the rearward position of the actuating member.

By these measures assurance is now for the first time had that the welding circuit can only be closed when the apparatus has been brought into correct position with respect to the workpiece. In this connection it has been found advantageous for at least one of the contacts to rest in force locked manner against the other contact as a result of spring tension. In this way the head of the apparatus can be readily replaced by another head adapted to the specific workpiece and/or material without the trouble of having to disconnect the electric line and again connect it.

Another advantageous embodiment of the object described above resides in the fact that an actuating member of adjustable effective length is provided.

This makes it possible precisely to adapt the holding distance of the stud to be welded from the workpiece before the release of the apparatus so as to change the acceleration path and thus adapt the speed of impingement of the stud upon release of the apparatus, on the workpiece to meet specific requirements.

For this purpose, one preferred embodiment is characterized by the fact that the actuating member is provided on its free end part with a cap which can be displaced along the actuating member and locked in place.

Furthermore, one advantageous embodiment of the above-described apparatus for the arranging thereof in proper position relative to the workpiece to which a stud is to be welded comprises an actuating member provided at its free end with a spacer having a plurality of resting points arranged in spaced relationship alongside each other at the same level.

One particularly advantageous embodiment for the further simplification of the handling of the apparatus and an increase in reliability in operation resides in providing an electric release device which is preferably adapted to become active electrically on a welding circuit switch in such manner that the release device and the welding current switch operate in synchronism.

In this way a previously unachieved constant synchronization of the switching process is obtained. Other advantageous features reside in the control by the electric device of the pawl which acts on the welding piston and the fact that the electric release device has a positioning member which is displaceable at a right angle to the longitudinal direction of the welding piston and terminates in an eye through which a finger mounted on the pawl and at least approximately directed in the same direction as the direction of displacement of the actuating member passes in a longitudinally displaceable manner.

Figure 2:
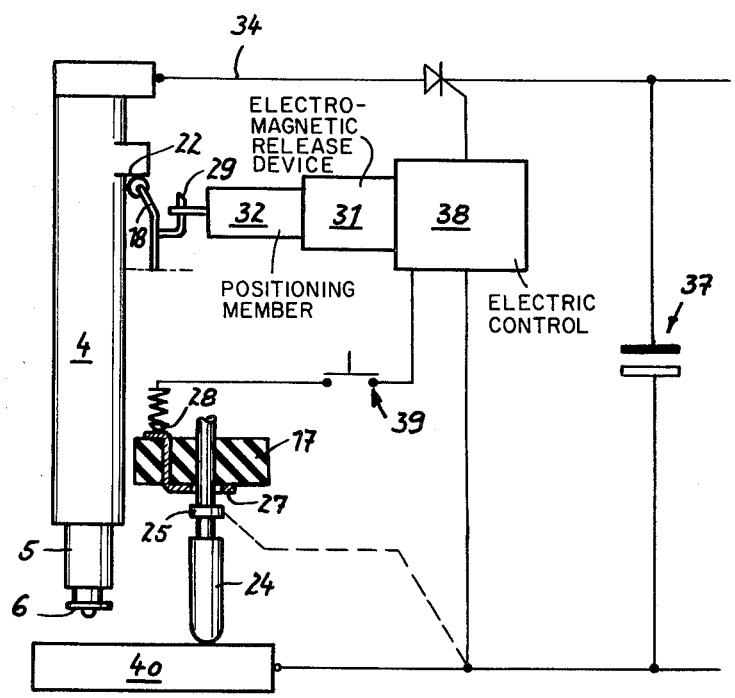

A preferred embodiment of the invention is shown in the accompanying drawings in which:

FIG. 1 shows substantially in longitudinal section an electric stud-welding apparatus, in accordance with the invention, and FIG. 2 shows a wiring diagram therefor.

The electric stud-welding apparatus of the present invention is designed for use in an assembly line and comprises a tubular housing 2 secured to a base member 1. Within the housing 2 a bushing 3 of insulating material is mounted within which is a welding piston 4 of electrically conductive material disposed for limited displacement coaxially with respect to the housing 2.

At its forward end, the welding piston 4 is provided with a stud holder 5 into which a weld stud 6 is inserted abutting in an axial direction against the end of an adjustable stop bolt 7. In the other end of the welding piston 4 a coil compression spring 8 is located resting at one end, via an insulating bushing 9, against the inner surface of the welding piston 4 and at the other end against an adjustment screw 10 arranged coaxially in the rearward end of housing 2 of the spring 8 thereby permitting compression adjustment.

There is further provided a rod-like actuating member 11 by means of which the welding piston 4 can be displaced against the force of the spring 8. The actuating member 11 protrudes from the housing 2 on the workpiece side of the stud welder and is mounted in the housing for limited displacement parallel to the axis of the welding piston 4 against the force of a return spring 12.

The actuating member 11 comprises a piston 14 of insulating material movably guided in bore 13 of the housing 2, a rearward rod 15 and a forward rod 16, the rods being spaced apart.

The two rods 15 and 16 are coaxially arranged with respect to each other, the rod 16 being supported in a bore in an end plate 17 of insulating material secured to the housing 2.

On the rod 15 a pawl 18 is pivoted which, by means of a leg spring 19, is pressed against the welding piston 4. On its free end the pawl 18 has a roller 20 which fits into a notched member arranged on the welding piston 4, the flat flank 22 of which notched member faces the roller 20 and is directed at a right angle to the longitudinal axis of the welding piston. The coil return spring 12 is mounted on the rod 15 with the spring resting under initial stress at one end against the piston 14 and at the other end, via an insulating ring 23, against the housing 2. The rod 16 has a cap 24 screwed on its free end.

Furthermore, a collar 25 and a snap ring 26 are arranged on the rod 16 and limit the axial displaceability of the rod 16. The rearward end of rod 16 rests against the piston 14.

The axial displaceability of the rod-like actuating member 11 corresponds at least to the axial displaceability of the welding piston 4.

Within the housing 2 a pair of contact elements 27, 28 are so arranged, in cooperation with the collar 25, that the control circuit is closed only when the actuating member 11 is in its rearmost position.

There is secured to the pawl 18 a finger 29 which is disposed parallel to the axis of the actuating member 11 when the pawl 18 is engaged. This finger 29 passes through a release device eye 30 which is fastened to the free end of a positioning member 32 which can be actuated by an electromagnetic release device 31. The release device 31 is arranged in the base member 1 and can be actuated by a switch (not shown in FIG. 1). A control line 33 which controls the welding circuit leads to the release device 31.

Furthermore, a welding current lead 34 is provided which is connected via electrically flexible strip-shaped conductors 35 to the welding piston 4. The release device 31 which acts on the pawl 18 is connected electrically in such manner that upon the closing of its circuit for the release of the pawl 18 the welding circuit is also closed and the positioning member 32 moves the finger 29 downward as shown in the drawing until the pawl 18 releases the welding piston 4.

Instead of the base member 1 with which are associated positioning members (not shown) for displacing the device in a longitudinal direction of the welding piston 4, there can instead be provided a handle which extends transversely of the longitudinal direction of the housing and in which are arranged the same individual parts as present in the base member 1.

In order to bring the apparatus into the ready-for-welding position, it is first brought mechanically or manually toward the workpiece to which the stud 6 is to be welded in such manner that the cap 24 of the rod-like actuating member 11 rests against the workpiece.

Upon further movement of the apparatus housing 2 toward the workpiece, the rod-like actuating member 11, whose pawl 18 is arranged so that it can engage into the notch 21 when both the actuating member 11 and the welding piston 4 are in their forward positions, is pushed into the apparatus housing.

In this way the welding piston 4 is carried along into its rearward position via the pawl 18 and the notch 21 and at the same time the spring 8 is further cocked.

When the rearward position of the rod-like actuating member 11 has been reached, the contact elements 27, 28 close an electric circuit which applies an electric voltage to the electromagnetic release device 31 so that the latter cannot act on the pawl 18 as long as the apparatus has not been brought into the correct operating position with respect to the workpiece.

After actuation of a switch which is associated with the release device eye 30 and which may be manually operatable, an electric voltage is applied to the electromagnetic release device 31 whereupon the positioning member 32 is electromagnetically moved downward carrying the pawl 18 with it via the eye 30 and the finger 29, whereupon the welding piston 4 moves forward rapidly as a result of the force of the coil spring 8 and presses the stud 6 against the workpiece.

Upon the actuation of the release device 31 an on-off switch for the welding circuit is so actuated by an electric control (not shown in FIG. 1) that a capacitor discharge takes place during the impingement of the stud 6 onto the workpiece. Instead of the cap 24, a spacer (not shown) having for instance three feet can be arranged on the rod 16 in a manner displaceable in the axial direction of the rod 16, whereby not only can the distance required in each specific case between the stud 6 and the workpiece to be fixed in a welding-readiness position as shown in the drawing but the apparatus can also be brought in positive manner into the correct position with respect to the workpiece when all three feet, which are radially spaced from the axis of the welding piston, rest against the workpiece. This is necessary particularly in the case of a portable apparatus, while in the case of a stationary apparatus (such as shown in the illustrative embodiment) a rod-shaped spacer is sufficient in order to determine the position of the apparatus. The cap 24 may also consist of electrically conductive wear-resistant material, for instance beryllium copper, and be connected to the welding current line so as to apply the welding current ground line to the workpiece via the cap 24, as shown as an alternative in dashed lines in FIG. 2. Within the tubular housing 2 opposite the piston 14 there is also provided a window 36 constituting a mark while on the piston 14 there is provided a scale which cooperates with the mark and can be read through the window, from which scale the spacing (air gap) preselected in each case between the stud 6 held in the welding readiness position and the workpiece can be read.

Thus it is not necessary to measure the air gap by means of a feeler gauge.

FIG. 2 shows an electric capacitor 37, the electric control box 38 and above described and a manually actuable switch 39 forming a feeler arranged in the control line. Number 40 diagrammatically illustrates a workpiece to which the stud 6 of the welding apparatus is to be welded.

The several elements, subassemblies and combinations of features are all deemed to form a part of the invention.

I claim:

1. An electrical stud-welding apparatus comprising a housing member, a welding piston supported for limited axial displacement in the housing, the apparatus having on one end a studholder protruding beyond the forward end of the housing and a force accumulator in the form of a spring element pressing against its other end, an actuating member for displacing the welding piston into its rearward position against the force of the spring element and held fast until the start of the welding process, the actuating member being disposed for resting on the workpiece-side of the apparatus in such manner that when the apparatus housing is brought toward the workpiece the welding piston is positively brought into the ready-for-welding position, said actuating member being constructed as a rod supported for limited displacement along an axis parallel to the welding piston, said rod, in its forward position, protruding beyond the stud holder with its inserted stud.

2. A stud-welding apparatus according to claim 1, wherein said force accumulator which urges the actuating member into its forward position is operatively associated with the said actuating member.

3. A stud-welding apparatus according to claim 2, wherein the force accumulator for the actuating member is a coil compression spring and is placed over the member with initial tension having one end resting against a shoulder of the actuating member and its other end resting against the apparatus housing.

4. A stud-welding apparatus according to claim 1, wherein a pawl actuated by a tripping device is mounted on the actuating member, said pawl, in the front end position of the actuating member, engaging positively with a notch in the welding piston.

5. A stud-welding apparatus according to claim 4, wherein the pawl carries a rotatably mounted supporting roller on its free end.

6. A stud-welding apparatus according to claim 4 wherein the flank of the notch against which the engaging pawl rests in flat and extends at a right angle to the longitudinal axis of the welding piston.

7. A stud-welding apparatus according to claim 1, wherein contact elements are provided on the actuating member which is electrically insulated from the welding piston and from the apparatus housing on which said contacts are arranged to indirectly effect a closing of the welding-current circuit only in the rearward position of the actuating member.

8. A stud-welding apparatus according to claim 7, wherein at least one of the contacts rests in force-locked manner under spring tension against the other contact.

9. A stud-welding apparatus according to claim 7, wherein an actuating member is constructed to have an adjustable effective length.

10. A stud-welding apparatus according to claim 9, wherein the actuating member has at its free end part a cap which can be adjusted along the actuating member and locked in position.

11. A stud-welding apparatus according to claim 9, wherein the actuating member has at its free end a spacer with a plurality of resting elements arranged in spaced apart relationship from and alongside each other at the same level.

12. A stud-welding apparatus according to claim 1, wherein an electromagnetic release device is actuated by a positioning member and is provided in the electrical control circuit of the apparatus.

13. A stud-welding apparatus according to claim 12, wherein the electric release device is adapted to enter into action electrically on a welding circuit switch in such manner that the release device and the welding circuit switch operate in synchronism.

14. A stud-welding apparatus according to claim 13, wherein the electric release device has a positioning member adjustable at a right angle to the lengthwise direction of the welding piston and terminating in an eye through which a finger, mounted on the pawl and directed at least approximately in the same direction as the direction of displacement of the actuating member, passes in a longitudinally displaceable manner.

* * * * *